Feb. 7, 1939.   H. L. BONE   2,146,462
RAILWAY BOOTLEG
Filed Nov. 18, 1936   3 Sheets-Sheet 1
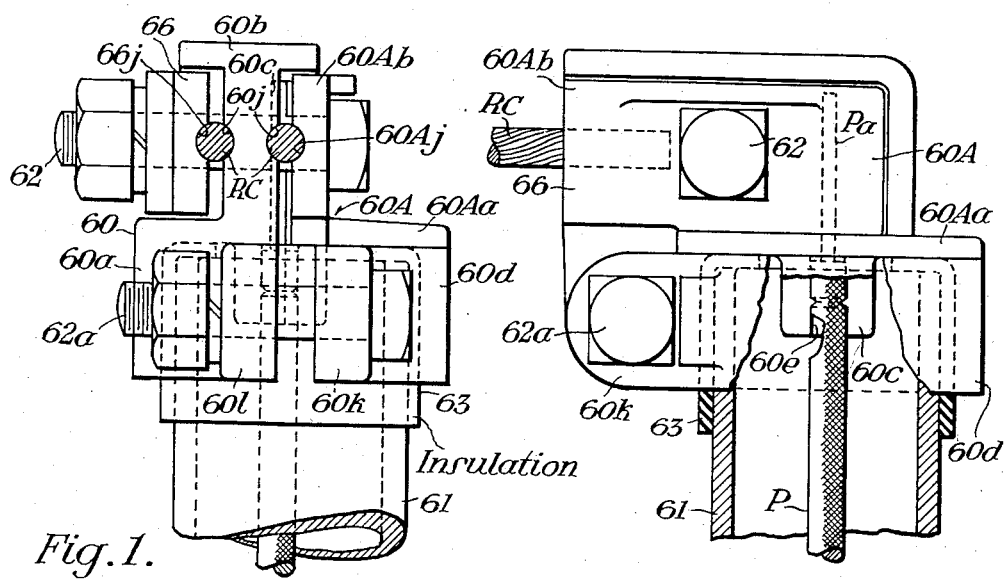
Fig.1.
Fig.1a.
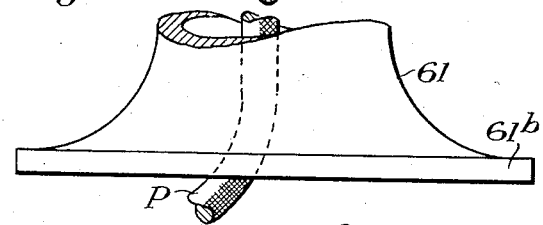
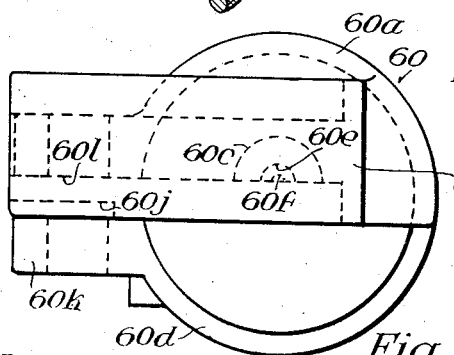
Fig.1c.
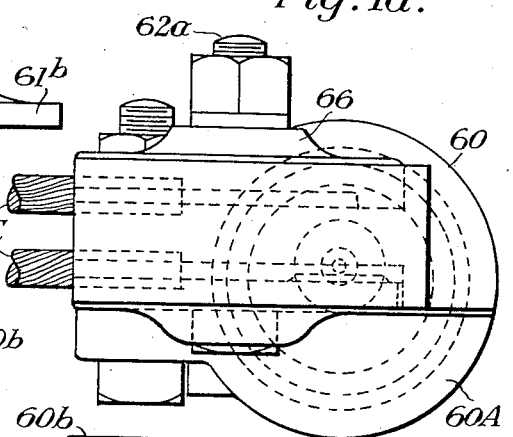
Fig.1b.
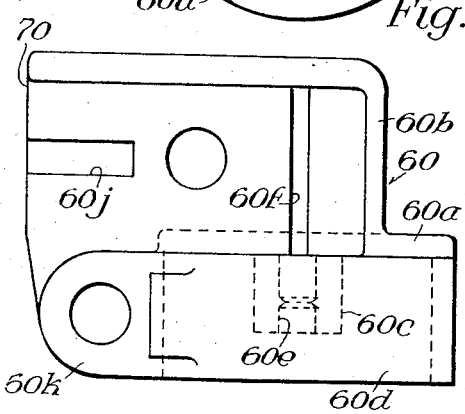
Fig.1d.
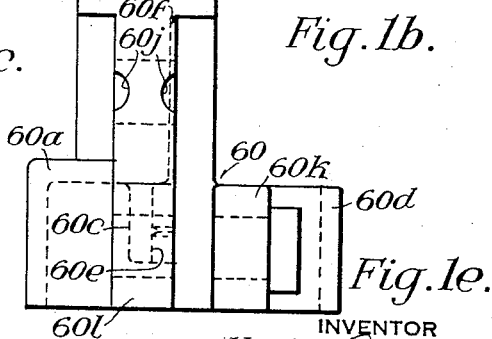
Fig.1e.
INVENTOR
Herbert L. Bone.
BY
HIS ATTORNEY Feb. 7, 1939.  H. L. BONE  2,146,462
RAILWAY BOOTLEG
Filed Nov. 18, 1936  3 Sheets-Sheet 2

INVENTOR
Herbert L. Bone.
BY
HIS ATTORNEY

Feb. 7, 1939. H. L. BONE 2,146,462
RAILWAY BOOTLEG
Filed Nov. 18, 1936 3 Sheets-Sheet 3
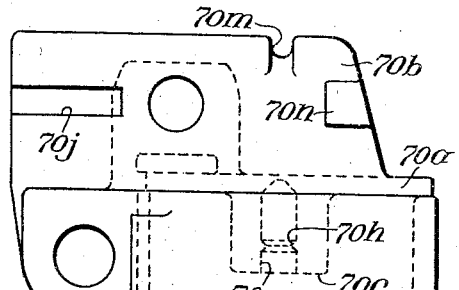
Fig. 2e.
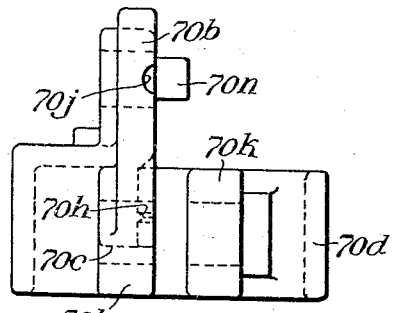
Fig. 2f.
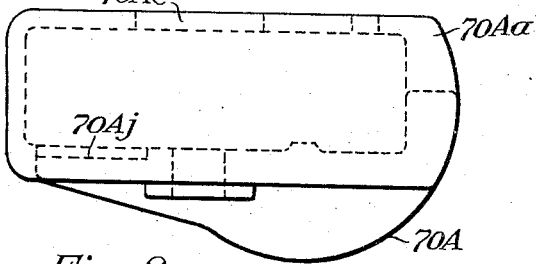
Fig. 2g.
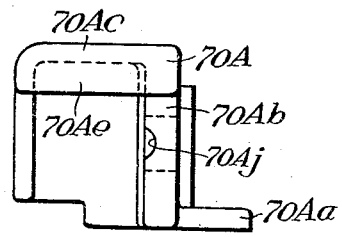
Fig. 2i.
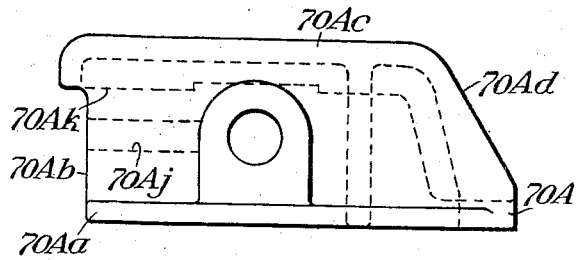
Fig. 2h.
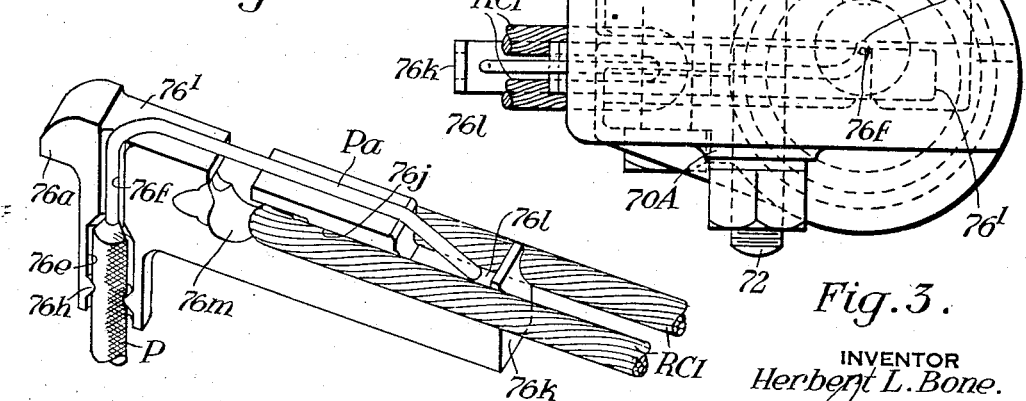
Fig. 3a.
Fig. 3.
INVENTOR
Herbert L. Bone.
BY
HIS ATTORNEY Patented Feb. 7, 1939

2,146,462

UNITED STATES PATENT OFFICE 2,146,462

RAILWAY BOOTLEG

Herbert L. Bone, Forest Hills, Pa., assignor to The Union Switch & Signal Company, Swissvale, Pa., a corporation of Pennsylvania Application November 18, 1936, Serial No. 111,462

9 Claims. (Cl. 247—1)

My invention relates to railway bootlegs, that is, to devices for connecting electrical conductors with the track rails of a railway.

The present application is a continuation-in-part of my copending application for Letters Patent of the United States, Serial No. 62,328, filed on February 4, 1936, for Railway bootlegs.

I will describe three forms of bootlegs embodying my invention, and will then point out the novel features thereof in claims.

Figure 1F:
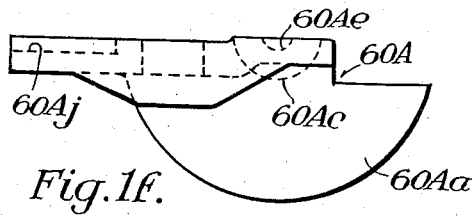
Figure 2C:
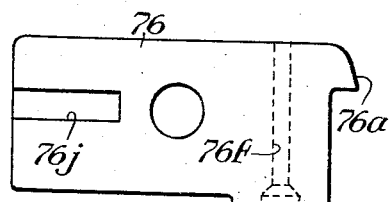
Figures 1G, 1H:
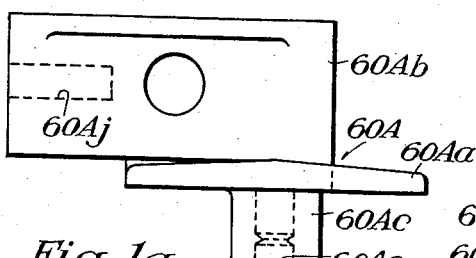
Figure 2:
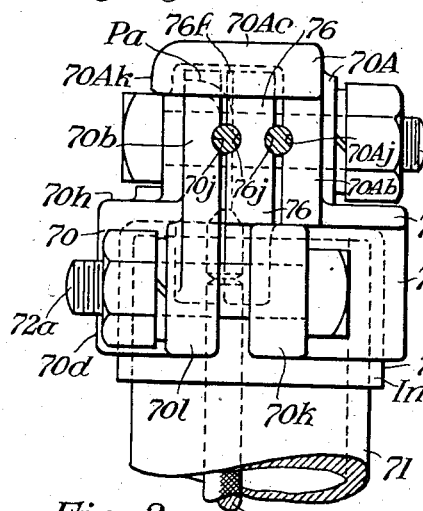
Figure 2A:
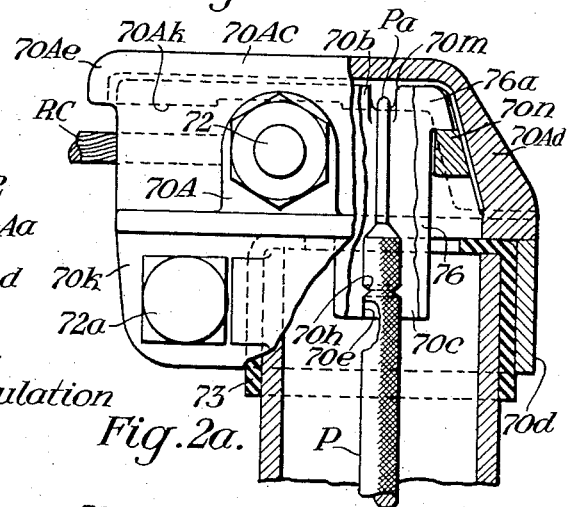
Figure 2D:
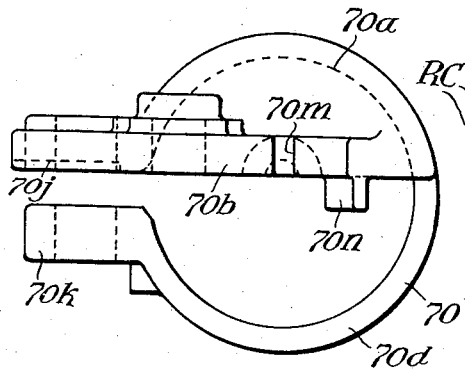
Figure 2B:
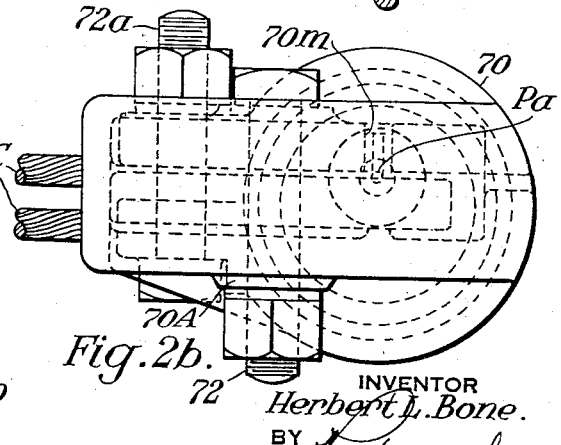

In the accompanying drawings, Fig. 1 is a front elevational view showing one form of bootleg embodying my invention. Fig. 1a is a view partly in section and partly in side elevation of the bootleg shown in Fig. 1. Fig. 1b is a top plan view of the bootleg as shown in Fig. 1a. Fig. 1c is a top plan view of the clamping member 60 forming part of the bootleg shown in Figs. 1, 1a, and 1b. Figs. 1d and 1e are front and side elevational views of the member 60 shown in Fig. 1c. Fig. 1f is a top plan view of the clamping member 60A forming part of the bootleg shown in Figs. 1, 1a, and 1b. Figs. 1g and 1h are front and side elevational views, respectively, of the clamping member 60A shown in Fig. 1f. Fig. 2 is a front elevational view showing another form of bootleg embodying my invention. Fig. 2a is a side view, partly in section and partly in elevation of the bootleg shown in Fig. 2, certain of the parts being broken away or removed to better illustrate the construction of the remaining parts. Fig. 2b is a top plan view of the bootleg as shown in Fig. 2a. Fig. 2c is a side view of the clamping member 76 forming part of the bootleg shown in the preceding views as this clamping member appears when viewed from the right in Fig. 2. Fig. 2d is a top plan view of the member 70 forming part of the bootleg shown in Figs. 2, 2a, and 2b. Figs. 2e and 2f are front and side elevational views, respectively, of the member 70 shown in Fig. 2d. Figs. 2g, 2h, and 2i are top plan, front, and side elevational views, respectively, of the member 70a forming part of the bootleg shown in Figs. 2, 2a, and 2b. Fig. 3 is a top plan view showing a modification of the bootleg shown in Figs. 2, 2a, and 2b. Fig. 3a is a view showing in isometric projection the clamping member 76¹ of the bootleg shown in Fig. 3.

Similar reference characters refer to similar parts in each of the several views.

Referring first to Figs. 1, 1a, and 1b, the bootleg in the form here shown comprises a suitable housing such as a pipe 61, the lower end of which, when the bootleg is in service, will be embedded in the ground, and the upper end of which will project above the surface of the ground. The lower end of the pipe 61 is provided with an integral bell-shaped flange 61b by means of which the pipe 61 may be securely anchored in place. An electrical conductor, here shown as an insulated wire P, is brought up from the ground through the pipe 61, and the flange 61b, in addition to serving as a means for anchoring the pipe 61 in place, also serves to prevent the formation of a sharp bend in the wire P at the point where the wire enters the pipe.

The bootleg also comprises a head assembly consisting of three clamping members 60, 60A, and 66. As best seen in Figs. 1c, 1d, and 1e, the clamping member 60 comprises a horizontal portion 60a which is adapted to close approximately one-half of the upper end of the pipe 61, an upwardly extending T-shaped portion 60b which is formed integrally with the horizontal portion 60a, a depending lug 60c which is also formed integrally with the horizontal portion 60a, and a split collar 60d which is likewise formed integrally with the horizontal portion 60a, and which is adapted to surround the upper end of the pipe 61. The two ends of the collar 60d are provided with lugs 60k and 60l which are apertured to receive a clamping bolt 62a, whereby the member 60 may be securely fastened to the upper end of the pipe 61. The clamping member 60 is insulated from the pipe 61 by an insulating member 63 having a cylindrical portion which is disposed between the pipe and the collar 60d, and a flange portion which is disposed between the upper end of the pipe and the horizontal portion 60a of the member 60. The lug 60c is provided with a groove 60e which receives a portion of the wire P below its non-insulated upper end Pa, and the T-shaped portion 60b is provided in one side thereof with a groove 60f which aligns axially with, and forms a continuation of, the groove 60e, and which receives the non-insulated upper end of the wire Pa. The upwardly extending T-shaped portion 60a is also provided in its opposite sides with horizontally extending grooves 60j which receive the two wires of a rail conductor RC.

The clamping member 60A comprises a semi-cylindrical horizontal lower portion 60Aa (see Figs. 1f, 1g, and 1h) which closes that portion of the pipe 61 which is not closed by the horizontal portion 60a of the member 60, a vertical portion 60Ab which is formed integral with the horizontal portion 60Aa, and a depending lug 60Ac which is also formed integral with the horizontal portion 60Aa. The lug 60Ac is provided with a groove 60Ae which mates with the groove 60e in the lug 60c of the member 60, while the vertical portion 60Ab is provided with a groove 60Aj which mates with the groove 60j in the T-shaped upper portion 60b of the member 60.

The clamping member 66 has a groove 66j in one side thereof which mates with the adjacent groove 60j in the side of the T-shaped upper portion 60b of the member 60. The three clamping members are securely fastened together by a single clamping bolt 62, which, when tightened, causes the wire P and the two wires of the rail connector RC to be firmly secured in their respective grooves, and also causes the wire P to have good electrical contact with the clamping members and with the wires of the rail connector.

Referring now to Figs. 2, 2a, and 2b, the bootleg in the form here shown comprises a pipe 71 similar to the pipe 61 shown in Fig. 1 provided at its upper end with a head assembly consisting of three clamping members 70, 70A, and 76. The clamping member 70 is similar to the clamping member 60 of the bootleg shown in Figs. 1, 1a, and 1b with the exception that the horizontal portion 70a (see Fig. 2d) covers a smaller portion of the top of the pipe 71 than the portion 60a of the member 60 covers of the top of the pipe 61, and the vertical portion 70b thereof, instead of being T-shaped, is made straight and is provided in its upper surface with a notch 70m, and at one end with a lug 70n. The clamping member 70 is secured to the pipe 71 by means of a bolt 72a which passes through apertured lugs 70k and 70l provided on the ends of the split collar 70d, and is insulated from the pipe by an insulating member 73 similar to the insulating member 63. The notch 70m is adapted to receive the bent upper non-insulated end Pa of the wire P in the manner shown in Fig. 2a, whereby the wire may be suspended from the head assembly before the other clamping members are bolted in place, and the depending lug 70c of the member 70 is provided with a groove 70e which extends downwardly below the notch 70m and receives a portion of the wire P from which the insulation has not been removed. The groove 70e is provided with a rib 70h which partly closes this groove, the groove 70e and the rib 70h being similar to the corresponding grooves and ribs shown in the preceding views. The vertical portion 70b of the member 70 is further provided in its inner face with a groove 70j for the reception of one of the wires of a rail connector RC, as will be apparent from an inspection of the drawings.

The clamping member 76 is preferably constructed of bronze and is disposed adjacent the grooved face of the vertical portion 70b of the clamping member 70. Formed in the face of the member 76 which is contiguous to the grooved face of the vertical portion 70b are grooves 76e and 76j which are similar to, and which mate with, the grooves 70e and 70j, respectively, in the portion 70b in the manner shown. The clamping member 76 is also provided in the face which is contiguous to the grooved face of the vertical portion 70b of the clamping member 70 with a third groove 76f which forms a continuation of the groove 76e and which receives the non-insulated upper end Pa of the wire P. The groove 76e is partly closed by a rib 76h which is similar to, and mates with, the rib 70h in the groove 70e. During assembly of the parts, the one end of the clamping member 76 rests on the top surface of the lug 70k, while the other end is supported by an integral projection 76a which rests on the lug 70n. The face of the member 76 opposite to that which is provided with the grooves 76e, 76f, and 76j is provided with another groove 76j which receives the remaining wire of the rail connector RC.

The clamping member 70A comprises a vertical portion 70Ab (see Figs. 2g, 2h, and 2i) which is disposed adjacent the face of the clamping member 76 which is opposite to the face which cooperates with the wire P, a lower integral horizontally extending portion 70Aa which closes the portion of the top of the pipe 71 which is not closed by the other clamping members, and an upper horizontally extending portion 70Ac which projects over the top of the clamping member 76 and the top of the vertical portion 70b of the clamping member 70. The vertical portion 70Ab of the member 70A is provided with a groove 70Aj which mates with the groove 76j in the adjacent face of the member 76. The three clamping members are secured together by means of a bolt 72 which passes through aligned holes in the member 76 and the vertical portions 70b and 70Ab of the clamping members 70 and 70A, and it will be apparent that when the bolt 72 is tightened the one wire of the rail connector RC and the wire P will be rigidly secured between the vertical portion 70b of the clamping member 70 and the clamping member 76, while the other wire of the rail connector will be rigidly secured between the clamping member 76 and the vertical portion 70Ab of the clamping member 70A.

It should be noted that the upper horizontal portion 70Ac of the member 70 is rectangular in shape, and that the one end of this horizontal portion is connected with the lower portion 70Aa by a tapered portion 70Ad. The reason for constructing the member 70A in this manner is to reduce to a minimum the liability of damage due to dragging railway equipment.

It should also be noted that the upper horizontal portion 70Ac of the member 70 is provided at its free edges with downwardly extending lips 70Ak and 70Ae which prevent the direct entrance of water into the pipe between the clamping members, but that, sufficient clearance is provided between the two clamping members 70 and 70A to allow for sufficient ventilation to prevent the condensation of moisture inside of the pipe 71.

One advantage of the bootleg shown in Figs. 2, 2a, and 2b is that the wire P can be loosely hooked in its final position in the bootleg assembly after the member 70 is clamped in place on the post 71, and as a result less slack is required in the wire P than is required in the form of the bootleg shown in Figs. 1, 1a, and 1b.

Referring now to Fig. 3, the chief difference between the bootleg here shown and that shown in Figs. 2, 2a, and 2b resides in the construction of the middle clamping member which is here designated 76¹. This clamping member is provided at its outer end with an extension 76k which projects outwardly for some distance beyond the forward edges of the vertical portions 70b and 70Ab of the cooperating clamping members 70 and 70A, and as shown in Fig. 3a, has its upper edge cut away in such manner that the bare upper end Pa of the wire P may be led forwardly from the upper end of the groove 76f along the top of the clamping member to a point above the extension 76k, and then bent downwardly into a transversely extending recess 76l which is provided in the top of the extension 76k, for a purpose presently to be described. The clamping member 76¹ is also provided with an L-shaped slot 76m, the vertical leg of which extends upwardly from, and forms a continuation of, the hole through which the clamping bolt 72 is adapted to pass, and the horizontal leg of which extends forwardly from, and forms a continuation of, the hole through which the clamping bolt 72 is adapted to pass. The slot 76m is intended to receive the rail connector RCI, which rail connector will preferably comprise a continuous stranded wire bent into a U-shape as shown in Fig. 3a, and the recess 76l together with the two arms of the rail connector RCI forms a well which can be filled with solder, thus sealing the wire P and the rail connector together, and hence providing a good connection between these parts and the clamping member 76. It should be noted that this soldering can be done after the bootleg is assembled by means of an ordinary soldering iron. The remainder of the clamping member 76¹ is identical in construction with the previously described clamping member 76, and the corresponding parts of the two clamping members are designated by the same reference characters. It is believed, therefore, that the construction of the bootleg shown in Fig. 3, as a whole, will be understood from the foregoing and from an inspection of the drawings without further detailed description.

One advantage of the form of bootleg shown in Fig. 3 over that shown in the preceding views is that since the wire P, the rail connector RCI, and the clamping plate 76¹ are all soldered together, a low resistance connection which will not be affected by excessive condensation or verdigris is insured.

Another advantage of the form of bootleg shown in Fig. 3 over that shown in the preceding views is that the rail connector RCI is securely anchored to the bootleg head in such manner that this rail connector cannot be pulled away from the bootleg head by dragging equipment without actually breaking the rail connector.

It should be particularly pointed out that while with the form of bootleg shown in Fig. 3 it is preferable to make the rail connector RCI in a U-shape in the manner described, this connector may if desired comprise two separate stranded wires arranged as shown in the preceding views.

Although I have herein shown and described only three forms of railway bootlegs embodying my invention, it is understood that various changes and modifications may be made therein within the scope of the appended claims without departing from the spirit and scope of my invention.

Having thus described my invention, what I claim is:

1. A bootleg for connecting an electric conductor with a rail connector comprising a tubular housing projecting upwardly from the ground; a head assembly comprising a first member having a first portion which partly closes the top of said housing, a second portion which projects upwardly from said first portion, a grooved third portion which projects downwardly from said first portion within said housing and receives said conductor and an integral split collar which surrounds the upper end of said housing, apertured lugs formed on the ends of said split collar, means for insulating said member from said housing, a bolt passing through said lugs for securing said first member and said insulating means to said housing, and a second member secured to the upwardly extending portion of said first member and provided with means for closing the otherwise uncovered portion of said housing and with means for clamping said conductor within said grooved portion and for electrically and mechanically connecting said conductor and said rail connector.

2. A bootleg for connecting an insulated electrical conductor with a rail connector comprising a tubular housing projecting upwardly from the ground and enclosing the conductor, a first metal member provided with a split collar portion which surrounds the upper end of said housing and is clamped thereto but insulated therefrom and with a horizontal portion which partly closes the top of said housing and with a grooved lug which projects downwardly from said horizontal portion within said housing and receives an insulated portion of said conductor and with a vertical portion provided at its upper end with a notch which receives the hook-shaped upper end of said conductor directly above said grooved lug, whereby said conductor may be loosely suspended from said first member, and a second member secured to the vertical portion of said first member and provided with means for clamping the insulated portion of said conductor within the groove in said lug and for electrically and mechanically connecting said conductor and said rail connector.

3. A bootleg for connecting an insulated electrical conductor with a rail connector comprising a tubular housing projecting upwardly from the ground and enclosing the conductor, a first metal member provided with a split collar portion which surrounds the upper end of said housing and is clamped thereto but insulated therefrom and with a horizontal portion which partly closes the top of said housing and with a grooved lug which projects downwardly from said horizontal portion within said housing and receives an insulated portion of said conductor and with a vertical portion, and a second member secured to the vertical portion of said first member and provided with means for clamping the insulated portion of said conductor within the groove in said lug and for electrically and mechanically connecting said conductor and said rail connector.

4. A bootleg for connecting an insulated electrical conductor with a two wire rail connector comprising a housing projecting upwardly from the ground and enclosing the conductor, a first metal member secured to the upper end of said housing and provided with a horizontal portion which partly closes the top of said housing and with a vertical portion, a second member clamped to the vertical portion of said first member and provided with a horizontal portion which closes the portion of the top of said housing which is not closed by said first member, and a third metal member clamped to the vertical portion of said first member at the side opposite said first member, a bare portion of said conductor and one wire of said rail connector being disposed between said first and second members, and the other wire of said rail connector being disposed between said first and third members, whereby said conductor and the two wires of said rail connector are electrically and mechanically secured together.

5. A bootleg for connecting an insulated electrical conductor with a two wire rail connector comprising a housing projecting upwardly from the ground and enclosing the conductor, the upper end of said conductor having the insulation removed therefrom, a first metal member secured to the upper end of said housing and provided with an integral vertical portion, a second metal member disposed adjacent one side of the vertical portion of said first member in a vertical position, a third metal member having a vertical portion disposed adjacent the outer side of said second member and having a horizontal portion which projects over said second member and the vertical portion of said first member, the bare portion of said conductor and one wire of said rail connector being disposed between the vertical portion of said first member and said second member, and the other wire of said rail connector being disposed between said second member and the vertical portion of said third member, and means for clamping all of said parts together to electrically and mechanically connect said conductor with the two wires of said rail connector.

6. A bootleg for connecting an insulated electrical conductor with a rail connector comprising a housing projecting upwardly from the ground and enclosing the conductor, a first metal member secured to the upper end of said housing and provided with a vertical portion and with a depending grooved lug which receives an insulated portion of said conductor, a second member disposed adjacent one side of the vertical portion of said first member and provided with a groove which mates with a groove in said vertical portion for the reception of said rail connector, means for clamping said two members together to clamp said connector in said mating grooves and the insulated portion of said conductor in the groove in said lug and a bare portion of said conductor above said insulated portion between said two members, and means including a laterally projecting lug on one of said members for positioning said two members relative to each other prior to clamping them together.

7. A bootleg for connecting an insulated electrical conductor with a rail connector comprising a housing projecting upwardly from the ground and enclosing the conductor, a first metal member secured to the upper end of said housing and provided with a horizontal portion which projects inwardly over the top of the housing and with a grooved lug which projects downwardly from said horizontal portion within said housing and receives an insulated portion of said conductor and with a vertical portion which projects upwardly from said horizontal portion, and a second member secured to the vertical portion of said first member and provided with means for clamping said conductor within the groove in said lug and with means including a well for the reception of solder for mechanically and electrically connecting said conductor and said rail connector.

8. A bootleg for connecting a conductor with a U-shaped rail connector comprising a metal member provided in its upper side with an L-shaped groove through which the rail connector passes and formed with a recess which receives the end of said conductor and which with the two legs of said connector forms a well for the reception of solder for soldering together said conductor and said rail connector to provide good electrical connection between them, and clamping means for forcing the legs of said connector against the sides of said metal member and for gripping said conductor to mechanically connect said conductor and said connector.

9. A bootleg for connecting an insulated electric conductor with a U-shaped rail connector comprising a metal member provided in its upper side with an L-shaped groove through which the rail connector passes and formed with a recess which receives the end of said conductor and which with the two legs of said connector forms a well for the reception of solder for soldering together a portion of said conductor from which the insulation has been removed and said rail connector to provide good electrical connection between them, and clamping means for forcing the legs of said connector against the sides of said metal member and for gripping an insulated portion of said conductor below said non-insulated portion to mechanically connect said conductor and said connector.

HERBERT L. BONE.